US011123863B2

(12) United States Patent
Kishi

(10) Patent No.: US 11,123,863 B2
(45) Date of Patent: Sep. 21, 2021

(54) TEACHING DEVICE, ROBOT CONTROL DEVICE, AND ROBOT SYSTEM

(71) Applicant: Seiko Epson Corporation, Tokyo (JP)

(72) Inventor: Yoshiyuki Kishi, Azumino (JP)

(73) Assignee: Seiko Epson Corporation

( * ) Notice: Subject to any disclaimer, the term of this patent is extended or adjusted under 35 U.S.C. 154(b) by 277 days.

(21) Appl. No.: 16/253,610

(22) Filed: Jan. 22, 2019

(65) Prior Publication Data

US 2019/0224842 A1 Jul. 25, 2019

(30) Foreign Application Priority Data

Jan. 23, 2018 (JP) .............................. JP2018-008603

(51) Int. Cl.
*B25J 9/16* (2006.01)
*B25J 13/06* (2006.01)

(52) U.S. Cl.
CPC ............ *B25J 9/163* (2013.01); *B25J 9/1697* (2013.01); *B25J 13/06* (2013.01)

(58) Field of Classification Search
USPC .................................................. 700/245–264
See application file for complete search history.

(56) References Cited

U.S. PATENT DOCUMENTS

| 4,380,696 | A | * | 4/1983 | Masaki | .................. | B25J 19/023 |
| | | | | | | 219/124.34 |
| 7,209,801 | B2 | * | 4/2007 | Anfindsen | .............. | B25J 9/1664 |
| | | | | | | 318/568.2 |
| 7,403,835 | B2 | * | 7/2008 | Sandner | ................. | B25J 9/1671 |
| | | | | | | 318/568.11 |
| 9,052,710 | B1 | * | 6/2015 | Farwell | .................. | B25J 9/1656 |
| 9,513,744 | B2 | * | 12/2016 | Pryor | .................... | G06F 3/0425 |
| 10,442,086 | B2 | * | 10/2019 | Chen | ........................ | B25J 19/00 |
| 2002/0036617 | A1 | * | 3/2002 | Pryor | ...................... | G06F 3/011 |
| | | | | | | 345/156 |
| 2003/0120391 | A1 | * | 6/2003 | Saito | ...................... | B25J 9/1671 |
| | | | | | | 700/264 |
| 2004/0046736 | A1 | * | 3/2004 | Pryor | ..................... | A63F 13/06 |
| | | | | | | 345/156 |
| 2005/0149231 | A1 | * | 7/2005 | Pretlove | ................. | B25J 9/1671 |
| | | | | | | 700/264 |
| 2005/0166413 | A1 | * | 8/2005 | Crampton | ............. | B25J 13/088 |
| | | | | | | 33/503 |
| 2005/0251290 | A1 | * | 11/2005 | Skourup | ............... | G05B 19/42 |
| | | | | | | 700/245 |
| 2005/0256611 | A1 | * | 11/2005 | Pretlove | ................ | G05B 19/42 |
| | | | | | | 700/264 |

(Continued)

FOREIGN PATENT DOCUMENTS

| JP | H11-237902 A | 8/1999 |
| JP | 2001-071292 A | 3/2001 |

*Primary Examiner* — Jonathan L Sample
(74) *Attorney, Agent, or Firm* — Harness, Dickey & Pierce, P.L.C.

(57) ABSTRACT

A teaching device for teaching a motion of a robot, including an image projector which projects an image on a projection surface in a working space of the robot; an indicator position detector which detects a position of an indicator on the projection surface; an image generator which generates or updates the image based on the position of the indicator that is detected by the indicator position detector; and a processor which calculates a teaching point for teaching a motion of the robot based on the position of the indicator.

10 Claims, 13 Drawing Sheets

(56) References Cited

U.S. PATENT DOCUMENTS

| | | | | |
|---|---|---|---|---|
| 2008/0249659 | A1* | 10/2008 | Ueyama | B25J 9/0018 |
| | | | | 700/245 |
| 2008/0301072 | A1* | 12/2008 | Nagatsuka | B25J 9/1671 |
| | | | | 706/12 |
| 2009/0132088 | A1* | 5/2009 | Taitler | B25J 13/02 |
| | | | | 700/264 |
| 2010/0036393 | A1* | 2/2010 | Unsworth | A61B 34/76 |
| | | | | 606/130 |
| 2010/0222925 | A1* | 9/2010 | Anezaki | G05D 1/0253 |
| | | | | 700/253 |
| 2013/0060146 | A1* | 3/2013 | Yang | G01B 11/24 |
| | | | | 600/476 |
| 2013/0343640 | A1* | 12/2013 | Buehler | B25J 9/1697 |
| | | | | 382/155 |
| 2014/0241614 | A1* | 8/2014 | Lee | H04N 13/254 |
| | | | | 382/154 |
| 2015/0002734 | A1* | 1/2015 | Lee | G06K 9/22 |
| | | | | 348/367 |
| 2015/0112482 | A1* | 4/2015 | Kuwahara | B25J 9/163 |
| | | | | 700/252 |
| 2016/0016315 | A1* | 1/2016 | Kuffner, Jr. | B25J 9/1676 |
| | | | | 700/255 |
| 2016/0059412 | A1* | 3/2016 | Oleynik | B62D 57/032 |
| | | | | 700/257 |
| 2016/0375592 | A1* | 12/2016 | Szatmary | B25J 9/1676 |
| | | | | 700/255 |
| 2017/0173796 | A1* | 6/2017 | Kim | G05D 1/0234 |
| 2019/0224842 | A1* | 7/2019 | Kishi | B25J 13/06 |
| 2019/0291277 | A1* | 9/2019 | Oleynik | B25J 9/1669 |

* cited by examiner

TEACHING DEVICE, ROBOT CONTROL DEVICE, AND ROBOT SYSTEM

BACKGROUND

1. Technical Field

The present invention relates to a teaching device, a robot control device, and a robot system.

2. Related Art

When moving the robot to any position, a method using a PC simulator needs to teach the robot while watching a screen on a display different from an actual space, thus it is difficult to designate a right position in the actual space.

In addition, jog operation on the PC or using a teaching pendant is accompanied by complex manipulations, and therefore practice and skill are required for smoothly moving the robot to the intended position.

Furthermore, direct teaching when a servo motor of the robot is turned ON may be dangerous because an operator has to directly touch the robot in a method using the direct teaching.

As a solution, a teaching device has been proposed in which working data is input in advance and a robot and a working target are projected by a projector (see, for example, JP-A-11-237902).

However, in JP-A-11-237902, an operator teaches while projecting the robot or the working target, but a teaching method requires for a manipulation on a projected image from a PC. That is, since the operator manipulates while watching a simulation image, there is a problem that teaching cannot be conducted while actually watching the robot.

SUMMARY

An advantage of some aspects of the invention is to solve the problems described above, and the invention can be implemented as the following forms or application examples.

Application Example 1

A teaching device according to this application example is a teaching device for teaching a motion of a robot, including an image projector which projects an image on a projection surface included in a working space of the robot; an indicator position detector which detects a position of an indicator with respect to the projection surface; an image generator which generates or updates the image based on the position of the indicator that is detected by the indicator position detector; and a processor which calculates a teaching point for teaching a motion of the robot based on the position of the indicator.

According to this application example, it is possible to project the image to be input to a working space and to detect and input a position of the indicator. Consequently, direct teaching in the actual working space of the robot can be realized, and thus it is possible to intuitively teach a motion of the robot.

Application Example 2

In the teaching device according to the application example, it is preferable that the indicator position detector acquires a trajectory representing a change in the position of the indicator, and the processor generates a plurality of the teaching points along the trajectory.

According to this application example, it is possible to easily conduct direct teaching in the actual working space of the robot.

Application Example 3

In the teaching device according to the application example, it is preferable that a receiver which receives an input of a Z-coordinate that is a distance in a normal direction with respect to the projection surface is provided, and the processor calculates a three-dimensional teaching point based on the teaching point and the Z-coordinate corresponding to the teaching point, and teaches a motion of the robot based on the three-dimensional teaching point.

According to this application example, it is possible to easily conduct direct teaching in the actual working space of the robot.

Application Example 4

In the teaching device according to the application example, it is preferable that the processor teaches a motion of the robot with a space surrounded by the plurality of teaching points and a plurality of the three-dimensional teaching points as a non-working space of the robot.

According to this application example, it is possible to easily conduct direct teaching in the actual working space of the robot.

Application Example 5

In the teaching device according to the application example, it is preferable that the processor teaches a motion of the robot with a space surrounded by a plurality of the teaching points and a plurality of the three-dimensional teaching points as a movement speed limit space of the robot.

According to this application example, it is possible to easily conduct direct teaching in the actual working space of the robot.

Application Example 6

In the teaching device according to the application example, it is preferable that the image generator generates an image such that a manipulation image indicating a manipulation of the robot is projected on an area surrounded by a plurality of the teaching points, and the processor teaches a motion of the robot based on the manipulation indicated by the manipulation image.

According to this application example, it is possible to easily conduct direct teaching in the actual working space of the robot.

Application Example 7

In the teaching device according to the application example, it is preferable that the manipulation image indicates a manipulation for changing a position and a posture of the robot by a certain amount.

According to this application example, it is possible to easily conduct direct teaching in the actual working space of the robot.

Application Example 8

In the teaching device according to the application example, it is preferable that the manipulation image indicates a manipulation for changing an excitation state of a motor of the robot.

According to this application example, it is possible to easily conduct direct teaching in the actual working space of the robot.

Application Example 9

A robot control device according to this application example is a robot control device connected to the teaching device of any one of the application examples, and which receives the teaching point or the three-dimensional teaching point and controls the robot.

According to this application example, it is possible to project the image to be input to a working space and to detect and input a position of the indicator. Consequently, direct teaching in the actual working space of the robot can be realized, and thus it is possible to intuitively teach a motion of the robot.

Application Example 10

A robot according to this application example is a robot controlled by the robot control device of the application example.

According to this application example, it is possible to project the image to be input to a working space and to detect and input a position of the indicator. Consequently, direct teaching in the actual working space of the robot can be realized, and thus it is possible to intuitively teach a motion of the robot.

Application Example 11

A robot system according to this application example is a robot system including a robot, the teaching device of any one of the application examples, and the robot control device of the application example.

According to this application example, it is possible to project the image to be input to a working space and to detect and input a position of the indicator. Consequently, direct teaching in the actual working space of the robot can be realized, and thus it is possible to intuitively teach a motion of the robot.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described with reference to the drawings. The drawings used in the detailed description are appropriately enlarged or reduced so as to easily recognize parts to be described.

Figure 1:
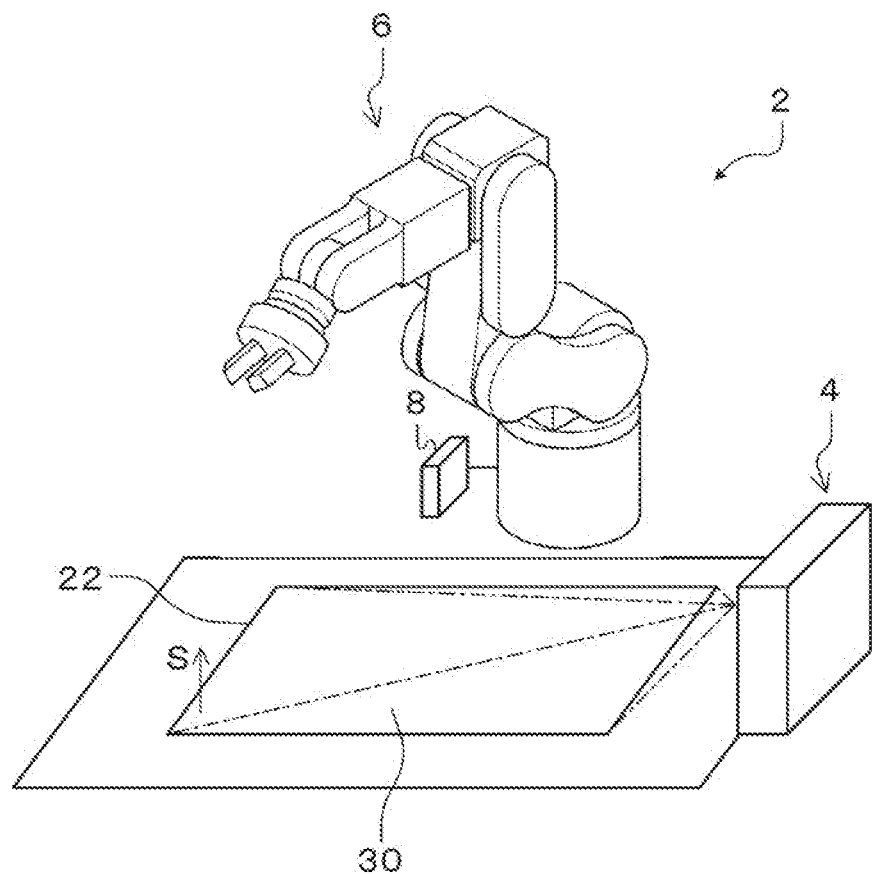
FIG. 1 is a perspective view of a robot system according to an embodiment.

FIG. 1 is a perspective view of a robot system 2 according to an embodiment. The robot system 2 according to the embodiment includes a teaching device 4, a robot control device 8, and a robot 6.

The teaching device 4 includes an image projector 10, a projection surface 22, and an indicator 24. The projection surface 22 is used as a surface of a working space 30 of the robot 6. The teaching device 4 projects an image to be input to the working space 30 using the image projector 10, and the image projector 10 detects and inputs the position of the indicator 24 by operating a whiteboard mode (described later).

Figure 3:
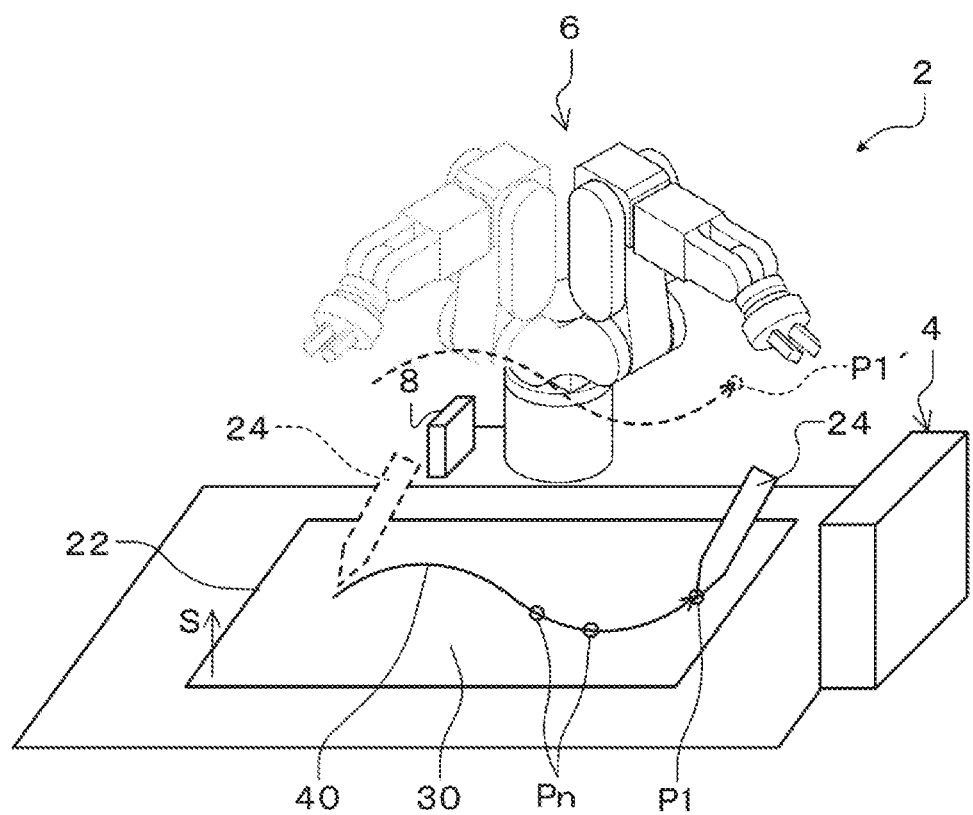
FIG. 3 is a perspective view of a robot system according to the embodiment.

The robot control device 8 is connected to the teaching device 4, and receives a teaching point P1 or a three-dimensional teaching point P1' to control the robot 6 (see FIG. 3).

The robot 6 is controlled by the robot control device 8.

Figure 2:
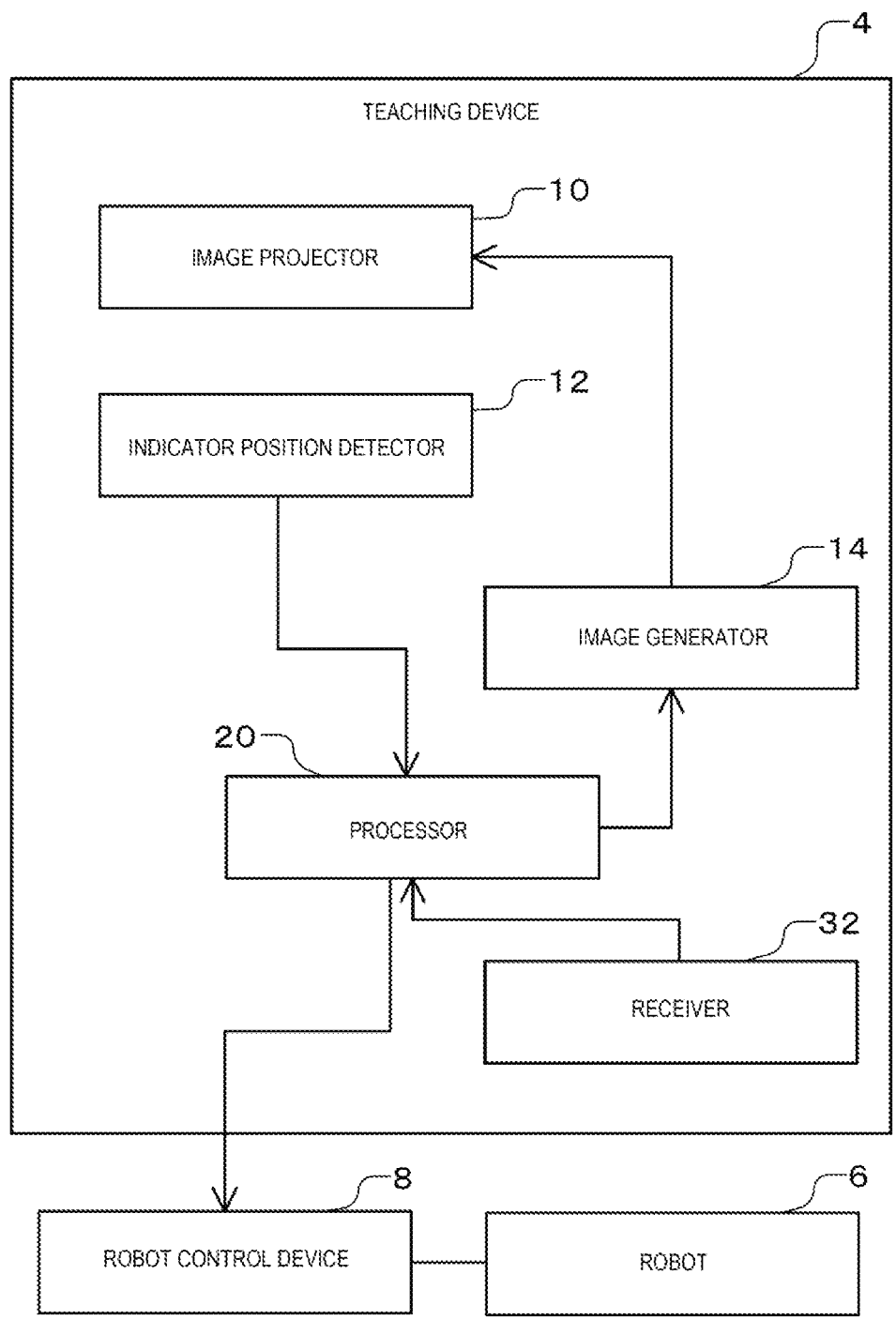
FIG. 2 is a block diagram illustrating an internal configuration of a teaching device according to the embodiment.

FIG. 2 is a block diagram indicating an internal configuration of the teaching device 4 according to the embodiment. The teaching device 4 includes the image projector 10, an indicator position detector 12, an image generator 14, and a processor 20. The teaching device 4 is a teaching device for teaching a motion of the robot 6.

The teaching device 4 includes a receiver 32 which receives an input of a Z-coordinate that is a distance in a normal direction S with respect the projection surface 22. The processor 20 calculates the three-dimensional teaching point P1' based on the teaching point P1 and the Z-coordinate corresponding to the teaching point P1. The processor 20 teaches a motion of the robot 6 based on the three-dimensional teaching point P1'. According to the embodiment, it is possible to easily conduct direct teaching in the working space 30 as an actual working space of the robot 6.

The image projector 10 projects the image on the projection surface 22 included in the working space of the robot 6. The projection surface 22 is arranged horizontally in FIG. 1. However, the projection surface 22 may be arranged vertically, or the robot system 2 may be used with the projection surface 22 as a surface having a random angle from a vertical surface. The image projector 10 has a function for projecting a projection image generated by the image generator 14 on the projection surface 22.

The indicator position detector 12 detects the position of the indicator 24 (see FIG. 3) with respect to the projection surface 22. The indicator position detector 12 acquires a trajectory 40 representing a change in the position of the indicator 24 (see FIG. 3). The processor 20 generates a plurality of the teaching points Pn along the trajectory 40 (see FIG. 3). According to the embodiment, it is possible to easily conduct direct teaching in the actual working space 30 of the robot 6. The indicator position detector 12 detects a position designation manipulation on the projection surface 22 by the indicator 24.

The indicator 24 is a pen-shaped indicator having a tip capable of emitting light, a shaft portion held by the user, and a button switch provided on the shaft portion. In the robot system 2, one or more indicators 24 may be used together with one or more non-light emitting indicators (non-light emitting pen, finger, etc.).

The image generator 14 generates or updates the image based on the position of the indicator 24 that is detected by the indicator position detector 12. The image generator 14 generates the image such that a tool box 44 (see FIG. 7) as a manipulation image indicating a manipulation of the robot 6 is projected on an area surrounded by a plurality of the teaching points Pn. The processor 20 teaches a motion of the robot 6 based on the manipulation indicated by the tool box 44. According to the embodiment, it is possible to easily conduct direct teaching in the actual working space 30 of the robot 6.

The tool box 44 indicates a manipulation for changing a position and a posture of the robot 6 by a certain amount. According to the embodiment, it is possible to easily conduct direct teaching in the actual working space 30 of the robot 6.

The tool box 44 indicates a manipulation for changing an excitation state of a motor of the robot 6. According to the embodiment, it is possible to easily conduct direct teaching in the actual working space 30 of the robot 6.

Figure 6:
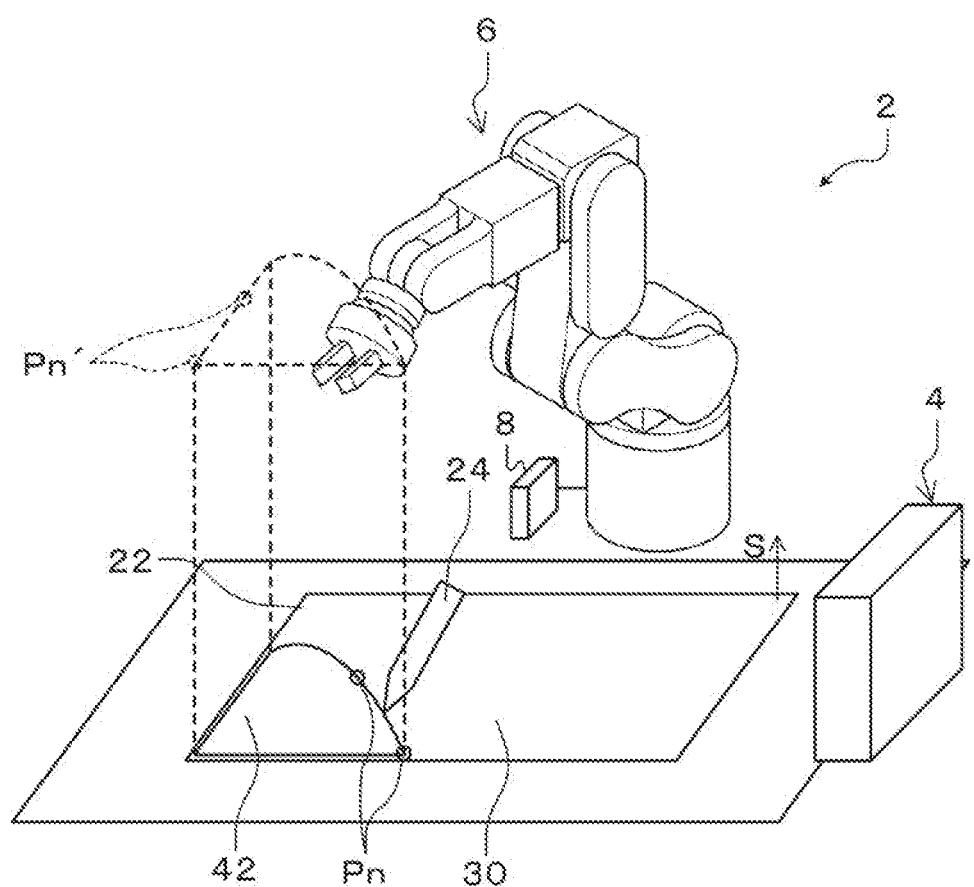
FIG. 6 is a perspective view of the robot system according to the embodiment.

The processor 20 teaches a motion of the robot 6 with a space surrounded by a plurality of the teaching points Pn and a plurality of the three-dimensional teaching points Pn' as a non-working space of the robot 6 (see FIG. 6). According to the embodiment, it is possible to easily conduct direct teaching in the actual working space 30 of the robot 6. The processor 20 calculates the teaching point Pn for teaching a motion of the robot 6 based on the position of the indicator 24.

The processor 20 teaches a motion of the robot 6 with a space surrounded by a plurality of the teaching points Pn and a plurality of the three-dimensional teaching points Pn' as a movement speed limit space of the robot 6. According to the embodiment, it is possible to easily conduct direct teaching in the actual working space 30 of the robot 6.

Examples of a factor, which causes the position of the indicator 24 to be detected and input in the teaching device 4, include jog (for example, a command for moving the robot 6 in an XYZ direction or a rotation direction of each axis), teaching point (or position of teaching point projected on a plane), non-working space, movement speed limit space, hand operation, returning to origin, camera imaging instruction (shutter), ON/OFF state of the servo motor, etc. Specific examples are described below.

FIG. 3 is a perspective view of the robot system 2 according to the embodiment. The indicator position detector 12 acquires a trajectory 40 representing a change in the position of the indicator 24. The processor 20 generates a plurality of the teaching points Pn along the trajectory 40. The motion teaching traces the described trajectory 40. By marking the trajectory with an arrow, a motion trajectory of the robot 6 can be taught so as to trace the arrow trajectory.

Using specific color dots marked in the working space 30 of the robot 6, the robot 6 may be taught to pass directly above such dots.

Figure 4:
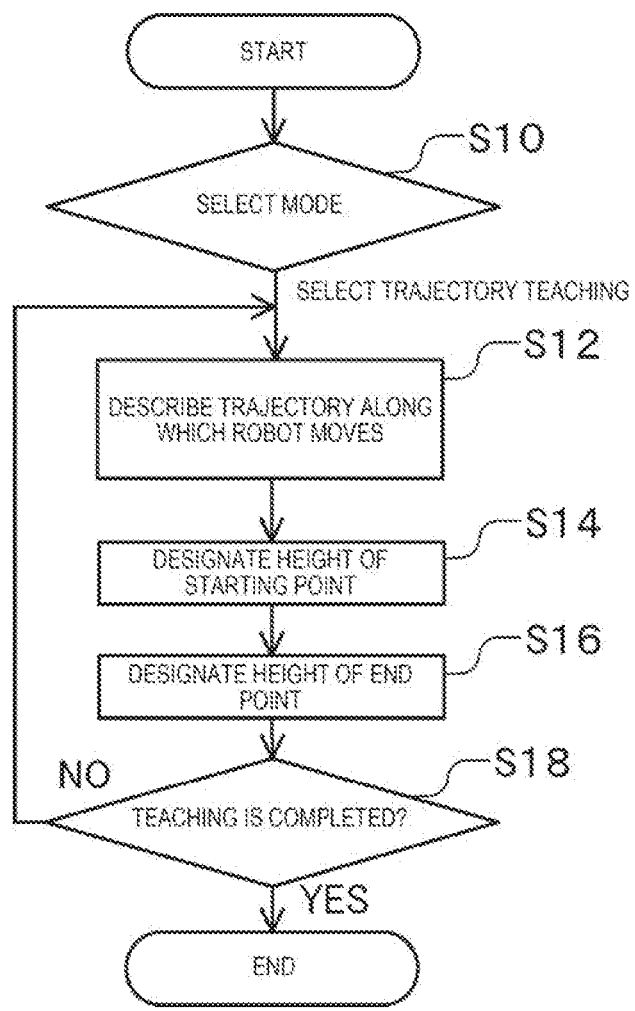
FIG. 4 is a flowchart illustrating trajectory teaching according to the embodiment.

FIG. 4 is a flowchart illustrating trajectory teaching according to the embodiment. First, in step S10, the processor 20 receives selection of a trajectory teaching mode from the receiver 32.

Next, in step S12, the processor 20 detects a description of the trajectory 40 of the indicator 24 along which the robot 6 moves by the indicator position detector 12.

In step S14, the processor 20 receives designation of a height of a starting point from the receiver 32.

In step S16, the processor 20 receives designation of a height of an end point from the receiver 32.

In step S18, the processor 20 determines whether or not the trajectory teaching mode is completed. If NO, the processor 20 returns to step S12. If YES, the processor 20 ends the trajectory teaching mode.

Figure 5:
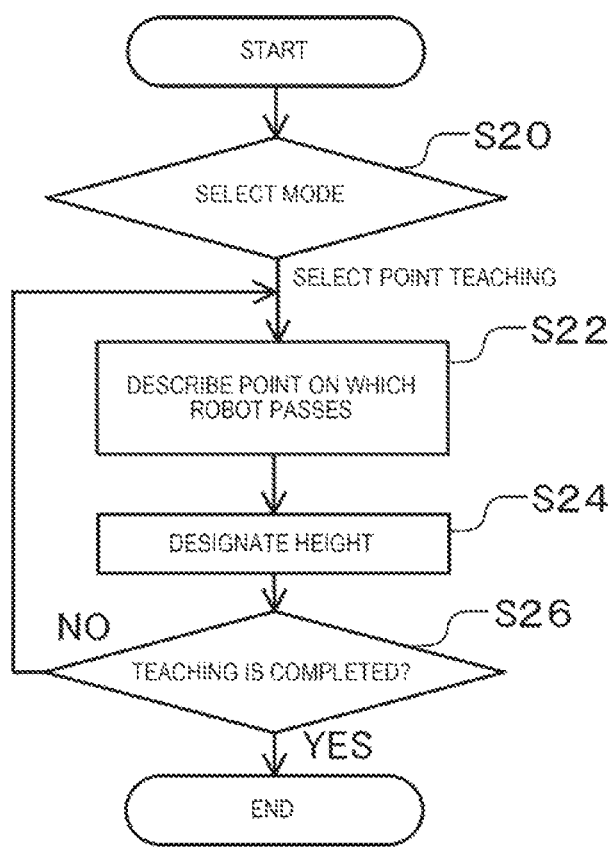
FIG. 5 is a flowchart illustrating point teaching according to the embodiment.

FIG. 5 is a flowchart illustrating point teaching according to the embodiment. The term "point" indicates a point to which the robot 6 moves next. First, in step S20, the processor 20 receives selection of a point teaching mode from the receiver 32.

Next, in step S22, the processor 20 detects a description of a point of the indicator 24, on which the robot 6 passes, by the indicator position detector 12.

In step S24, the processor 20 receives designation of a height of the working space 30 from the receiver 32.

In step S26, the processor 20 determines whether or not the point teaching mode is completed. If NO, the processor 20 returns to step S22. If YES, the processor 20 ends the point teaching mode.

FIG. 6 is a perspective view of the robot system 2 according to the embodiment. The processor 20 teaches a motion of the robot 6 with the space 42 surrounded by a plurality of the teaching points Pn and a plurality of the three-dimensional teaching points Pn' as the non-working space of the robot 6. The space 42 is defined as a range where the robot 6 is prohibited from entering. By enclosing the space 42 with the specific color, such a space may be taught as an entry prohibition space of the robot 6.

The processor 20 may teach a motion of the robot 6 with the space 42 surrounded by a plurality of the teaching points Pn and a plurality of the three-dimensional teaching points Pn' as the movement speed limit space of the robot 6. The space 42 may be defined as a motion speed limit space of the robot 6. By enclosing the space 42 with the specific color, the robot 6 may be taught to move at the designated speed when the robot 6 enters such a space.

Figure 7:
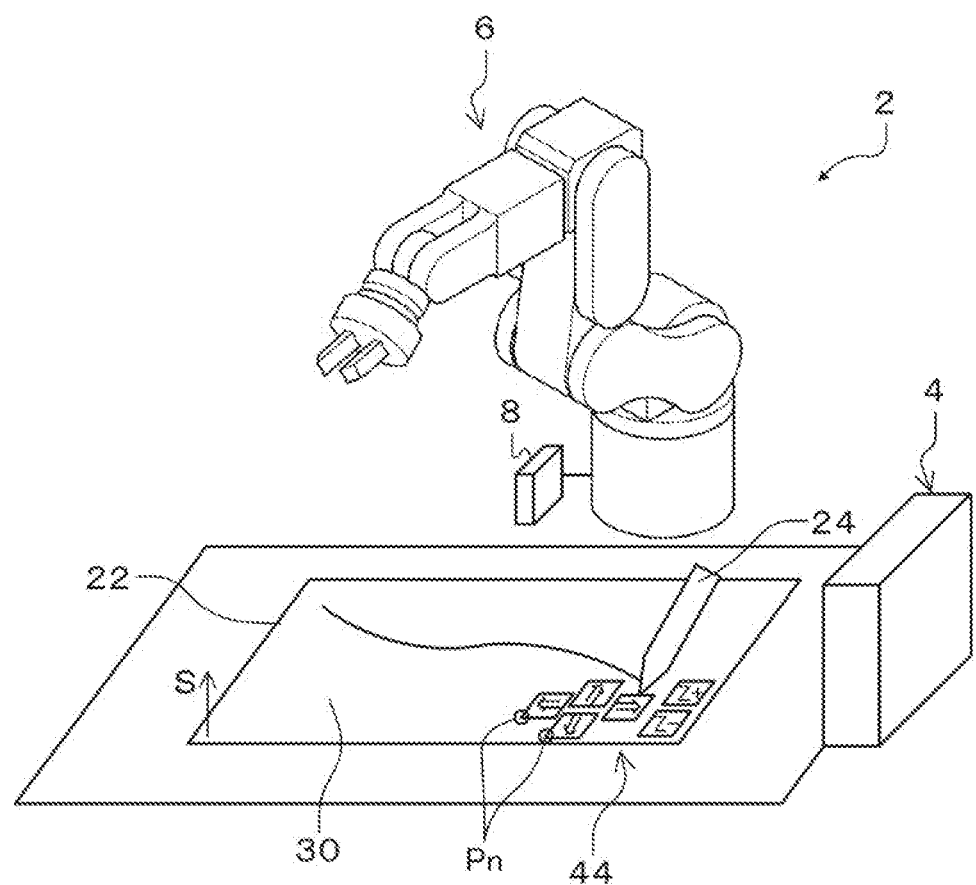
FIG. 7 is a perspective view of the robot system according to the embodiment.

FIG. 7 is a perspective view of the robot system 2 according to the embodiment. The image generator 14 generates the image such that the tool box 44 indicating a manipulation of the robot 6 is projected on the area surrounded by a plurality of the teaching points Pn. The processor 20 teaches a motion of the robot 6 based on the manipulation indicated by the tool box 44.

The tool box 44 indicates a manipulation for changing a position and a posture of the robot 6 by a certain amount. When tapping a button displayed in the tool box 44, the robot 6 performs an operation displayed on the button (JOG mode). That is, a button projected by the image projector 10 is tapped, the robot 6 moves as indicated by the button. Examples of the operation performed by the robot 6 include general jog operation, opening/closing the hand, moving the arm to the initial posture, shooting with the camera, turning the servo motor ON, turning the servo motor OFF, etc.

Teaching and operations of the robot 6, caused by tapping the button or inputting specific characters or symbols, may be designated by the user.

The teaching device 4 projects the image to be input to the working space 30 by the image projector 10, and the image projector 10 detects and inputs the position of the indicator 24 by operating a whiteboard mode.

The whiteboard mode is a mode in which the user can randomly draw on the projection surface 22 using the indicator 24. The projection image including the tool box 44 as the manipulation image is projected on the projection surface 22. The tool box 44 includes a cancel button for undoing the processing, an indicator button for selecting the mouse indicator, a pen button for selecting the pen tool for drawing, an eraser button for selecting the eraser tool for erasing the drawn image, and a forward/backward button for advancing the screen forward or returning screen backward. The user can perform the processing according to the button or select a tool by clicking one of these buttons using the indicator 24. The mouse pointer may be set to be selected as a default tool immediately after the robot system 2 is activated. In the example of FIG. 7, the user selects the pen tool and then moves the indicator 24 in the projection surface 22 in a state where a tip of the indicator 24 is in contact with the projection surface 22, and thus a line is drawn in the projection image. This line drawing is carried out by the image generator 14 in the teaching device 4.

Furthermore, the image projector 10 is operable in other modes instead of the whiteboard mode. For example, the robot system 2 is also operable in a PC interactive mode in which an image of data transferred from a personal computer (not shown) via a communication line is displayed on the projection surface 22. In the PC activation mode, for example, the image of data, such as data of spreadsheet software, is displayed, and the data can be input, created or modified using various tools and icons presented in the image.

Figure 8:
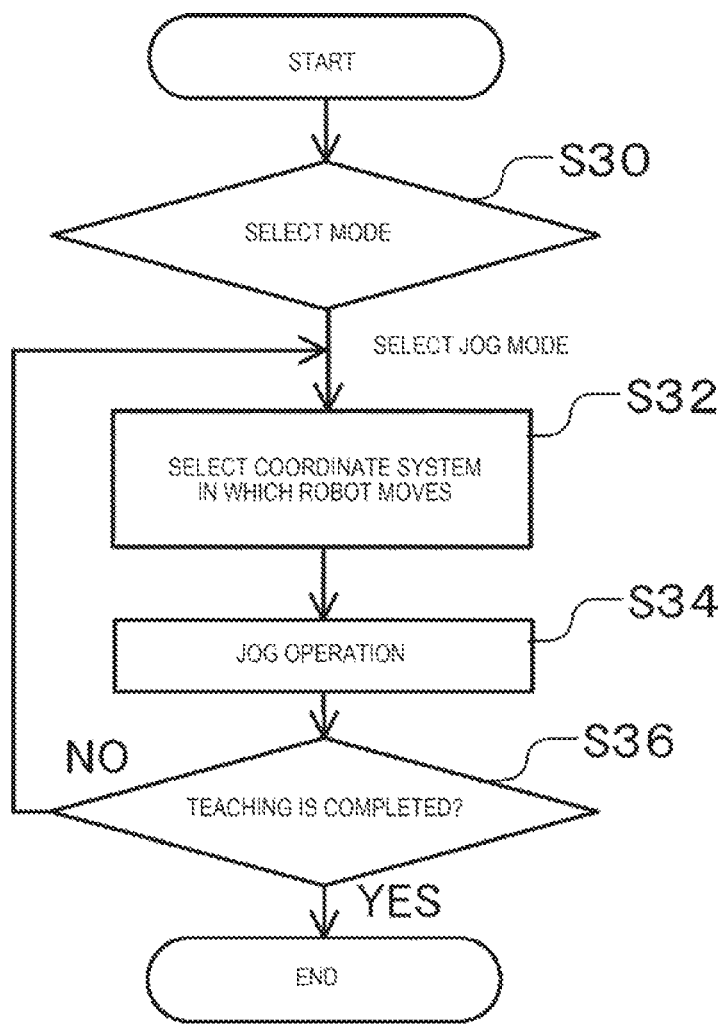
FIG. 8 is a flowchart illustrating a JOG mode according to the embodiment.

FIG. 8 is a flowchart illustrating a JOG mode according to the embodiment. First, in step S30, the processor 20 receives selection of a JOG mode from the receiver 32.

Next, in step S32, the processor 20 detects selection of a coordinate system in which the robot 6 moves by the indicator position detector 12.

In step S34, the processor 20 receives designation of a height of the working space 30 from the receiver 32.

In step S36, the processor 20 determines whether or not the JOG mode is completed. If NO, the processor 20 returns to step S32. If YES, the processor 20 ends the JOG mode.

Figure 9:
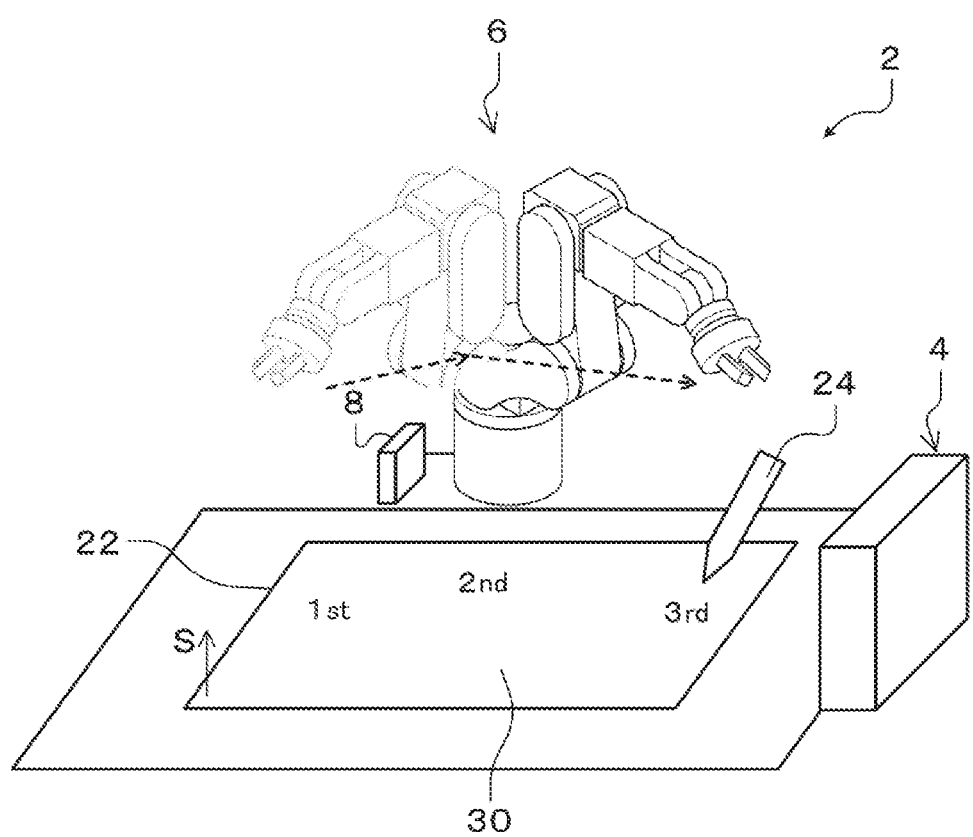
FIG. 9 is a perspective view of the robot system according to the embodiment.

FIG. 9 is a perspective view of the robot system 2 according to the embodiment. By filling, for example, "first, second, third . . . " using the indicator 24 in the working space 30, the robot 6 is taught to move in that order. The motion teaching may be carried out with the entered characters or symbols. The robot 6 may also be taught to perform a predetermined operation when filling the specific character strings. Examples of the predetermined operation include general jog operation, opening/closing the hand, moving the arm to the initial posture, shooting with the camera, turning the servo motor ON, turning the servo motor OFF, etc.

Figure 10:
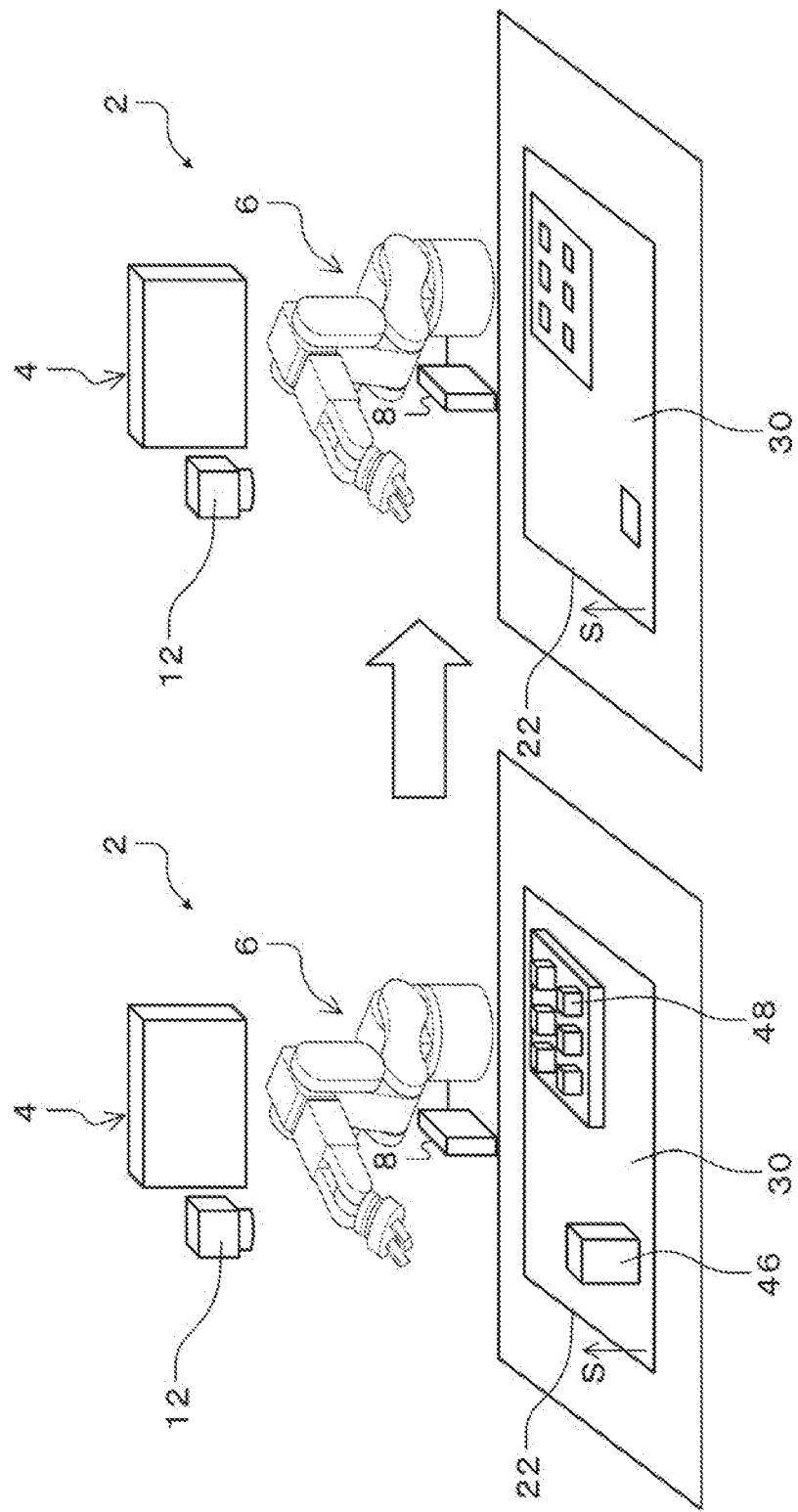
FIG. 10 is a perspective view of the robot system according to the embodiment.

FIG. 10 is a perspective view of the robot system 2 according to the embodiment. The working environment is projected to prepare environmental replica for subsequent teaching. In a case where one robot 6 carries out a plurality of workings in one working space 30 (for example, work A for this week, work B for next week, and work A again for week after next . . . ), the operator may want to always install the tool 46 and the component 48, used in each work, at the same positions. In such a case, by shooting the environment at the time of teaching, and by projecting the image from the next time to install the tool 46 and the component 48 at the same position referring to the image, the environment can be easily reproduced without the need for taking measurements.

Figure 11:
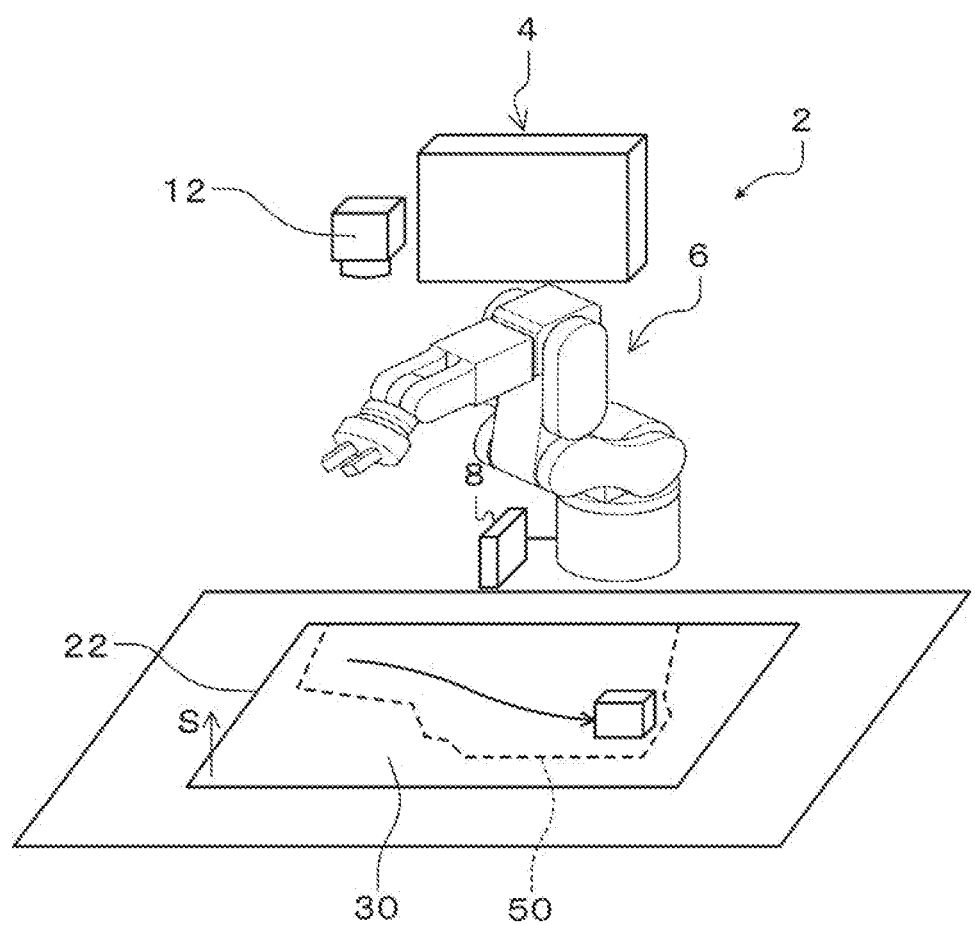
FIG. 11 is a perspective view of the robot system according to the embodiment.

FIG. 11 is a perspective view of the robot system 2 according to the embodiment. The image projector 10 projects a direction in which the robot 6 moves, a next destination, the outermost edge 50 through which the robot arm passes, the detection result of the object by image processing, etc.

The user does not know what action the robot 6 will take next by just looking at the robot 6 from the outside. Since the user's arm and the robot arm have different structures, even if the user knows where the robot 6 will subsequently move to, the joints may stick out in unexpected direction instead of a direction assumed by the user. When the robot 6 performs unexpected actions, the robot 6 may be stopped with the emergency stop button or the like to prevent collision with surrounding objects or the user. However, if the robot 6 is forcibly stopped in a case where the user cannot predict the motion of the robot 6 but the robot 6 operates in right manner, the work efficiency will drastically deteriorate. According to the embodiment, it is possible to highlight the trajectory or next destination point of the robot 6 with the symbols when operating the robot 6 based on the teaching data.

Figure 12:
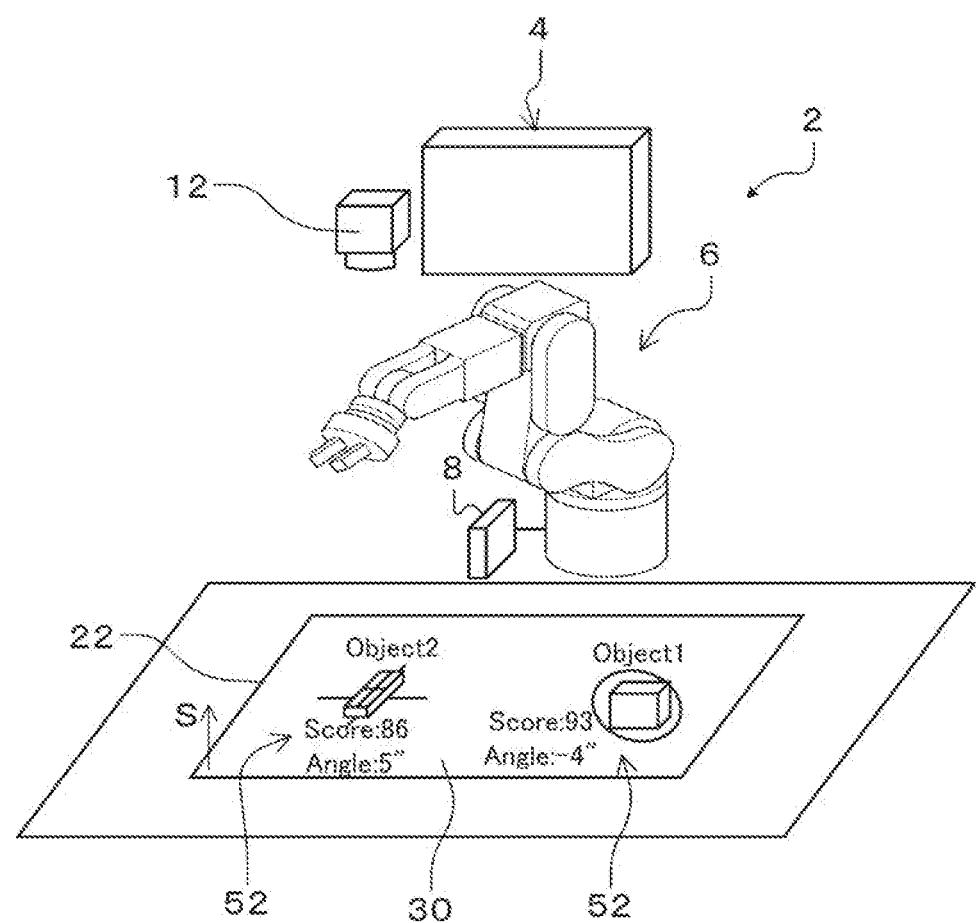
FIG. 12 is a perspective view of the robot system according to the embodiment.

FIG. 12 is a perspective view illustrating the robot system 2 according to the embodiment. In a case where the robot 6 is expected to pick up the object based on the vision's detection results, the user observing the robot 6 wants to determine whether or not the detection is correctly carried out in the actual space before the robot 6 is activated. As shown in FIG. 12, the image projector 10 projects a direction in which the robot 6 moves, a next destination, the outermost edge through which the robot arm passes, the detection result 52 of the object by image processing, etc., and thus the user observing the robot 6 can recognize the motion of the robot 6 and whether or not the detection is properly conducted.

In the existing robot teaching operations, (1) teaching with a teaching pendant is accompanied with complex manipulations and therefore practice and skill are required for smoothly moving the robot to the intended position; (2) teaching on a simulator also has to be mastered since the target robot is taught on the display different from the actual space; and (3) direct teaching is difficult to designate a non-working space in which the robot does not operate or a space in which the robot slows down.

According to the invention, it is possible to project the image to be input to the working space 30 and to detect and input the position of the indicator 24. Consequently, direct teaching in the actual working space 30 of the robot 6 can be realized, and thus it is possible to intuitively teach a motion of the robot 6.

Embodiments of the invention are not limited to the exemplary embodiment stated above, and can be implemented as follows.

Figure 13:
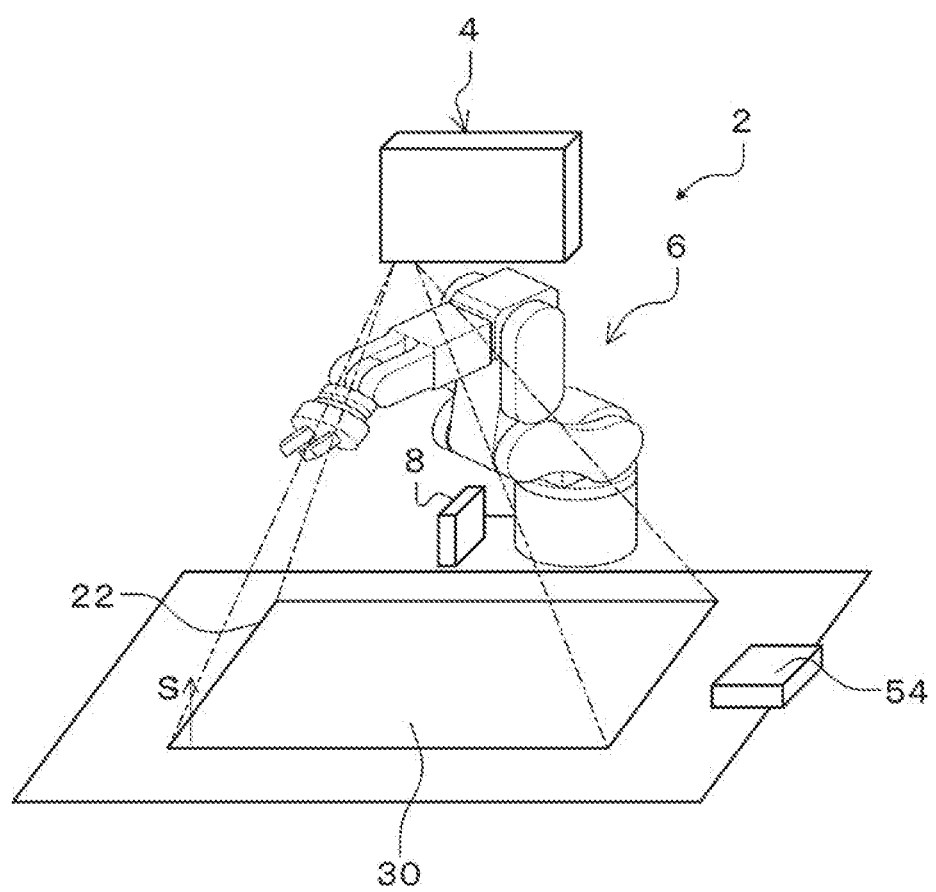
FIG. 13 is a perspective view of a robot system according to a Modification Example.

FIG. 13 is a perspective view of the robot system 2 according to a Modification Example. In the embodiment described above, the indicator 24 is detected by the indicator position detector 12 of the teaching device 4. However, the invention is not limited thereto. For example, the teaching device 4 may be configured not to include the indicator position detector 12 as shown in FIG. 11. As shown in FIG. 13, a touch unit 54 may be installed to detect the indicator 24. The touch unit 54 may be an image pickup device or a sensor that projects infrared rays and detects the reflected light. As long as it is capable of detecting the position of the indicator 24, the detection principle is not limited.

The robot 6 may be taught using a function of the interactive projector. The robot 6 may be taught using a whiteboard function (electronic blackboard function) of the interactive projector. For example, when the teaching device 4 inputs the Z-coordinate that is a distance in the normal direction S with respect to the projection surface 22, the image projector 10 projects the image to be input to the working space 30, instead of the receiver 32, and detects and inputs the position of the indicator 24 by operating the whiteboard function, considering the input information as the Z-coordinate.

The teaching device, the robot and the robot system according to the invention are described based on the illustrated embodiments, however, the invention is not limited thereto. The configuration of each part may be replaced with a random configuration with equivalent function, or other components may be added.

The entire disclosure of Japanese Patent Application No. 2018-008603, filed Jan. 23, 2018 is expressly incorporated by reference herein.

What is claimed is:

1. A teaching device for teaching a motion of a robot, the teaching device comprising:
an image projector configured to directly project an image on a working surface of a work area of the robot; and
a processor configured to execute processes so as to:
detect a position of an indicator on the working surface of the work area within the projected image by detecting light from the indicator by using an image pickup device;
update the projected image based on the detected position of the indicator; and
calculate a teaching point based on the detected position of the indicator.

2. The teaching device according to claim 1,
wherein the processor is further configured to acquire a trajectory representing a change in the position of the indicator, and
the processor is configured to generate a plurality of the teaching points along the trajectory.

3. The teaching device according to claim 1,
wherein the processor is configured to receive an input of a Z-coordinate that is a distance along a normal direction from the working surface of the work area, and
wherein the processor is configured to calculate a three-dimensional teaching point based on the teaching point and the Z-coordinate corresponding to the teaching point a and teach the motion of the robot based on the three-dimensional teaching point.

4. The teaching device according to claim 3,
wherein the processor is configured to teach the motion of the robot with a space surrounded by a plurality of the teaching points and a plurality of the three-dimensional teaching points, and the space is defined as a non-working space of the robot.

5. The teaching device according to claim 3,
wherein the processor is configured to teach the motion of the robot with a space surrounded by a plurality of the teaching points and a plurality of the three-dimensional teaching points, and the space is defined as a movement speed limit space of the robot.

6. The teaching device according to claim 4,
wherein the processor is configured to generate a manipulation image indicating a manipulation of the robot,
the image projector is configured to project the manipulation image in an area surrounded by the plurality of teaching points on the working surface of the work area, and
the processor a is configured to teach the motion of the robot based on the manipulation indicated by the manipulation image.

7. The teaching device according to claim 6,
wherein the manipulation image indicates a manipulation of changing a position and a posture of the robot by a certain amount.

8. The teaching device according to claim 6,
wherein the manipulation image indicates a manipulation of changing an excitation state of a motor in the robot.

9. A robot control device connected to the teaching device according to claim 1, the robot control device comprising:
a processor,
wherein the processor is configured to receive the teaching point from the teaching device and control the robot based on the teaching point.

10. A robot system comprising:
the robot;
the teaching device according to claim 1; and
a robot control device connected to the teaching device, the robot control device being configured to control the robot based on the teaching point received from the teaching device.

* * * * *